(12) United States Patent
Pedroza et al.

(10) Patent No.: US 9,231,974 B2
(45) Date of Patent: Jan. 5, 2016

(54) DYNAMIC POLICY-BASED ENTITLEMENTS FROM EXTERNAL DATA REPOSITORIES

(71) Applicant: International Business Machines Corporation, Armonk, NY (US)

(72) Inventors: Miguel Pedroza, Austin, TX (US); Craig Robert William Forster, Austin, TX (US); Umesh Prithviraj Adtani, Pune (IN); Yogesh Suresh Shukla, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 13/839,798

(22) Filed: Mar. 15, 2013

(65) Prior Publication Data

US 2014/0282831 A1    Sep. 18, 2014

(51) Int. Cl.
*G06F 17/00*   (2006.01)
*H04L 29/06*   (2006.01)

(52) U.S. Cl.
CPC ............ *H04L 63/20* (2013.01); *H04L 63/10* (2013.01)

(58) Field of Classification Search
CPC ......... H04L 63/20; H04L 63/08; G06F 21/00; G06F 21/629; G06F 21/60
See application file for complete search history.

(56) References Cited

U.S. PATENT DOCUMENTS

| | | | |
|---|---|---|---|
| 7,457,815 B2 * | 11/2008 | Hsu et al. | 1/1 |
| 7,467,414 B2 | 12/2008 | Schlesinger | |
| 7,757,271 B2 * | 7/2010 | Amdur et al. | 726/1 |
| 8,010,991 B2 | 8/2011 | Sarukkai et al. | |
| 8,359,629 B2 * | 1/2013 | Kohlenberg et al. | 726/1 |
| 2006/0236369 A1 * | 10/2006 | Covington et al. | 726/1 |
| 2008/0184336 A1 * | 7/2008 | Sarukkai et al. | 726/1 |
| 2009/0254753 A1 * | 10/2009 | De Atley et al. | 713/176 |
| 2011/0246498 A1 | 10/2011 | Forster | |
| 2012/0124639 A1 * | 5/2012 | Shaikh et al. | 726/1 |
| 2013/0060803 A1 * | 3/2013 | Maman et al. | 707/760 |
| 2013/0160075 A1 * | 6/2013 | Schlesinger et al. | 726/1 |

OTHER PUBLICATIONS

White, A., "Integrating WebSphere Service Registry and Repository with IBM Tivoli Security Policy Manager," IBM Redpaper, 2009.
"Method for secured and tokenized hitlist exchange between data repositories, federated search server, access manager and client," IPCOM000198802D, Aug. 17, 2010.
IBM, "Role Association and Entitlement Web Service," IPCOM000011710D, Mar. 12, 2003.
Oracle, "Identity and Access Management: Comparing Oracle and NetIQ/Novell," Dec. 2011.

* cited by examiner

*Primary Examiner* — Fikremariam A Yalew
(74) *Attorney, Agent, or Firm* — Jeffrey S. Labaw; David H. Judson

(57) ABSTRACT

A machine-implemented method for evaluating a context-based (e.g., XACML) policy having a set of attributes formulates a search against one or more existing external repositories using a query that is dynamically-generated based on the security policy being evaluated. The approach shifts the building of a candidate set of potentially-allowable resources to the authorization engine (e.g., a Policy Decision Point (PDP)). In operation, an application calls the PDP using an entitlement request and, in response, the PDP builds the candidate set of values based on the defined security policy by generating a query to an external data repository and receiving the results of that query. This approach enables a policy-driven entitlement query at runtime.

25 Claims, 6 Drawing Sheets

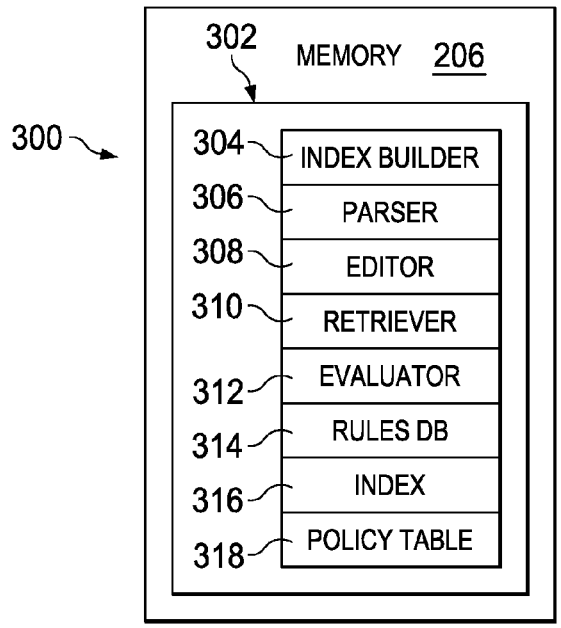

FIG. 3

```
<Rule RuleId="view-own-accounts" Effect="Permit">
<Target />
<Condition>
        <Apply FunctionId="string-equals">
                <ResourceAttributeDesignator
                        AttributeId="db:customer-id" DataType="#string" />
                <SubjectAttributeDesignator
                        AttributeId="customer-id" DataType="#string">
</Condition>
</Rule>
```

FIG. 12

-Subject/subject-id = "craigf"
-Subject/customer-id = "Cust001"
-Action/action-id = "view"
-Return attribute? Resource/db:account-id

FIG. 13

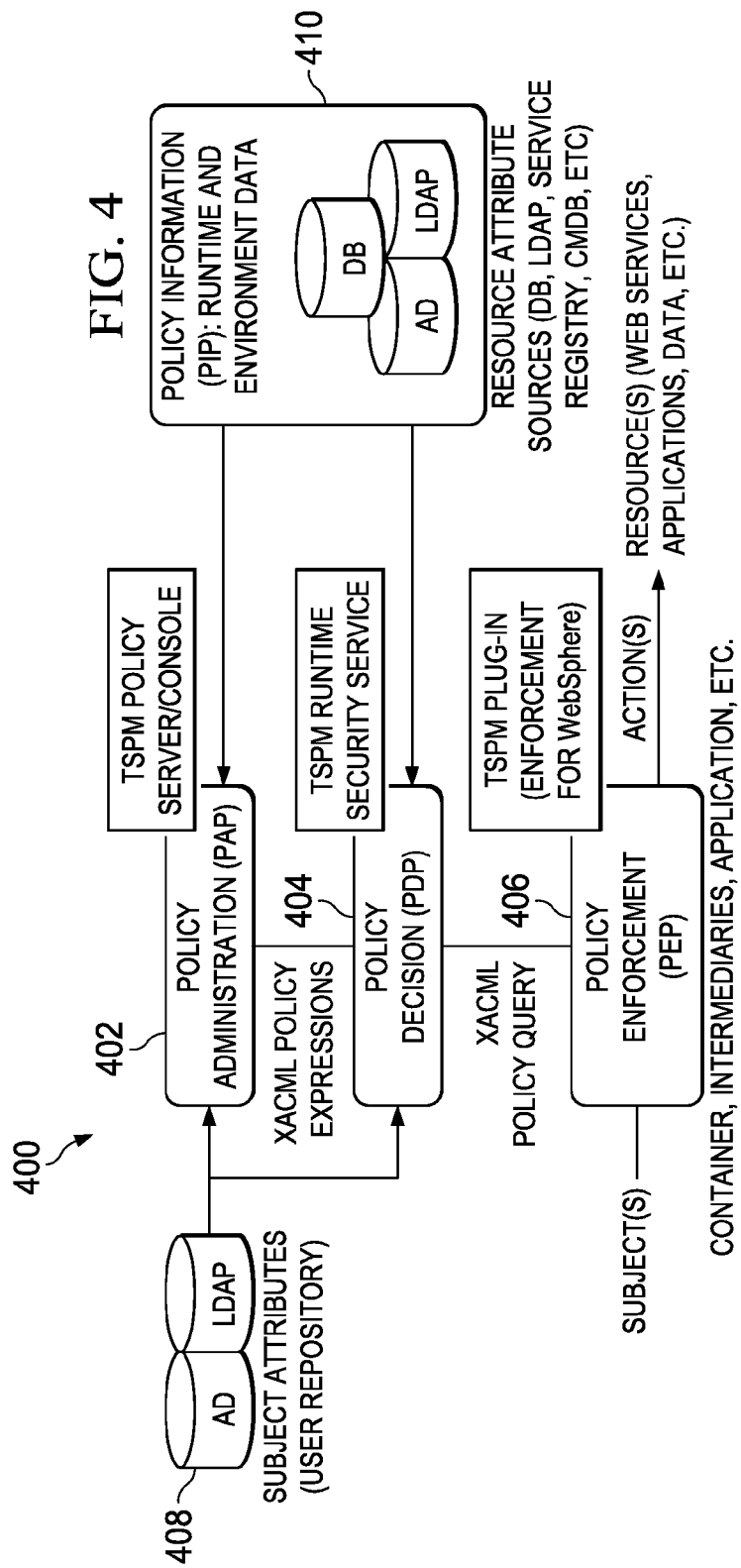

STOCK_SYMBOLS

| SYMBOL | EXCHANGE |
|--------|----------|
| IBEM | NEWSE |
| FAKEB | NOSDOCK |
| GGL | NOSDOCK |
| BOA | NEWSE |
| ... | ... |

```
<Rule RuleId="permit-trades" Effect="Permit">
<Target>
        <Action>
                <ActionMatch Function="string-equals">
                        <ActionAttributeDesignator Id="action-id" />
                        <AttributeValue>trade</AttributeValue>
                </ActionMatch>
        </Action>
</Target>
<Condition>
        <Apply FunctionId="string-equals">
                <ResourceAttributeDesignator
                        AttributeId="exchange" DataType="#string" />
                <SubjectAttributeDesignator
                        AttributeId="trade-exchange" DataType="#string">
</Condition>
</Rule>
```

FIG. 9

Subject/subject-id: cn=craig,o=ibem,c=us
Subject/group-id: cn=trader,o=ibem,c=us; cn=employee,o=ibem,c=us
Action/action-id: trade Requested attribute: Resource/resource-id

FIG. 10

| ACT_ID  | CUST_ID | TYPE     | BAL     |
|---------|---------|----------|---------|
| 000-001 | Cust001 | CHECKING | $500    |
| 000-002 | Cust002 | CHECKING | $2,000  |
| 000-003 | Cust002 | SAVINGS  | $10,000 |

FIG. 11

DYNAMIC POLICY-BASED ENTITLEMENTS FROM EXTERNAL DATA REPOSITORIES

BACKGROUND OF THE INVENTION

1. Technical Field

This disclosure relates generally to access control mechanisms in a distributed computing environment and, in particular, to techniques for evaluating context-based policies for authorization and entitlements processing.

2. Background of the Related Art

The eXtensible Access Control Markup Language, or XACML, is an Organization for the Advancement of Structured Information Standards (OASIS)-managed industry standard for managing access control policy. The industry standard is available from the OASIS web site. XACML provides an XML-based context-based security language for specifying access control policies. When used for access control, existing open standard formats such as XACML are focused around returning a single access decision, such as "permit" or "deny." In contrast, "entitlements" involve the notion of returning a set of items for which access is allowed. Typically, entitlements are a set of control specifications (rendered through policies) that govern an identity's access to information, application and systems, where a user is one such identity. Support for entitlements is a common requirement to facilitate more efficient access control models.

In contextual security policy such as XACML, wherein an access control request is composed of a context containing attributes about the request itself and the relevant environment, entitlements often are provided by selecting from the policy a subset of these attributes to "index" and support. This approach, however, does not scale to large data sets where the data to be returned is defined in an external repository. Of course, a "brute-force" approach where every possible return value (from an external database) is examined by the authorization engine is not scalable.

More generally, the problem to be solved is how to determine which resources from a very large data set are authorized to have an action performed on them by a user. The criteria under which access should be granted is defined in a set of security policies; however, the resources that are being accessed are stored outside of the set of security policies, e.g., in an existing external repository such as a database or LDAP server.

Existing solutions to this problem (other than the brute force approach) either require pre-filtering the data before consulting a decision engine, or duplicating the set of possible resources into the security policy or a supplemental data store. In the pre-filtering approach, a two-stage process is implemented. The application first calls the database to build a candidate set of allowed values; then, for each value, the application calls an authorization engine using an authorization request to decide if the current user is allowed access. This approach has a number of limitations including that the security policy is duplicated or partially duplicated in both the application and the authorization engine. Because the query is often hard-coded into the application, any changes require development, test, production and Q/A cycle that is expensive and time-consuming. Moreover, in this approach the filtering responsibility shifts from the policy decision point to the application, and this creates a further burden on the application because it needs to make a series of individual authorization requests for each candidate (or a large access query for everything). In the data duplication approach, data is duplicated from the existing repository either into the security policy or a supplemental data store; then, the application calling the authorization engine uses an entitlement request to obtain the set of values. The limitations of this approach are that there is no longer a single canonical store of data, and the data duplication can require significant use of disk space and memory. Moreover, if the security policy approach is used, then changes to the set of possible values requires modifying the policy and loading it into the authorization engine, thus possibly implicating workflow and governance procedures.

It would be desirable to allow entitlements to be evaluated using a contextual security policy language such as XACML irrespective of whether resources being accessed are stored externally to the security policy.

BRIEF SUMMARY

A machine-implemented method for evaluating a context-based (e.g., XACML) policy having a set of attributes formulates a search against one or more existing external repositories using a query that is dynamically-generated based on the security policy being evaluated. The approach shifts the building of a candidate set of potentially-allowable resources to the authorization engine (or, more generally, a Policy Decision Point (PDP)). In operation, an application calls the PDP using an entitlement request and, in response, the PDP builds the candidate set of values based on the defined security policy by generating a query to an external data repository and receiving the results of that query. This approach enables a policy-driven entitlement query at runtime.

In an illustrative embodiment, and in response to receipt of an entitlements request at an authorization engine, a set of one or more XACML rules that are applicable to the current entitlement request are determined; in the alternative, these rules may be pre-determined or otherwise obtained. For each applicable rule, a query to an external repository is dynamically-generated based on the rule to find a "candidate set" of return values. The query does not have to be an exact translation of the XACML rule—it exists primarily as a way to narrow the search space to obviate a brute-force search of the database or repository. The query can be in many forms including, without limitation, direct translation to a SQL statement, direct translation to a LDAP filter, translation to an intermediary form that is back-end agnostic, or the like. In this manner, the "candidate set" of potential values is bounded to the set of values defined by the security policy itself (or by a purpose-built supplemental store), and not from the existing external sources themselves. To complete the operation, each element of this candidate set (returned from the query to the external data store) is evaluated against the full policy as an authorization request to ensure all the requirements of the security policy are being met.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 is a block diagram of high level components of a policy evaluation manager used to facilitate the techniques described herein;

FIG. 4 illustrates a representative policy management system for authoring, distributing and enforcing policies;

FIG. 9 is a representative XACML security policy that is enforced at a PDP (in the first example scenario) using the dynamic policy-based entitlement querying method of this disclosure;

FIG. 10 is a representative entitlement request issued from a trading application and received by the PDP for processing in the first example scenario;

FIG. 11 is a representative database table for use according to a second example scenario;

FIG. 12 is a representative XACML security policy that is enforced at a PDP (in the second example scenario) using the dynamic policy-based entitlement querying method; and FIG. 13 is a representative entitlement request issued from a banking application and received by the PDP for processing in the second example scenario.

DETAILED DESCRIPTION OF AN ILLUSTRATIVE EMBODIMENT

Figure 1:
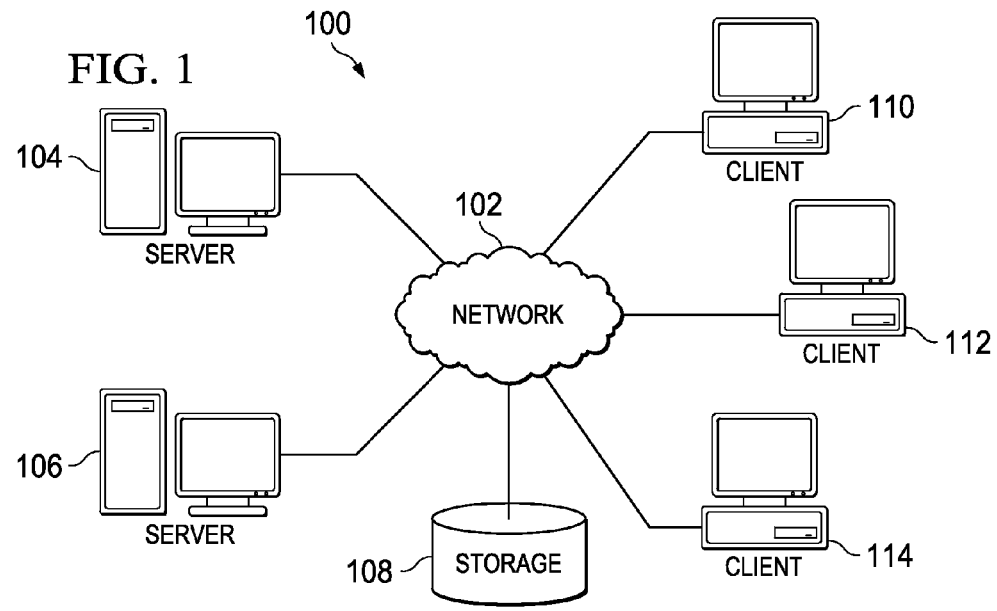
FIG. 1 depicts an exemplary block diagram of a distributed data processing environment in which exemplary aspects of the illustrative embodiments may be implemented.
Figure 2:
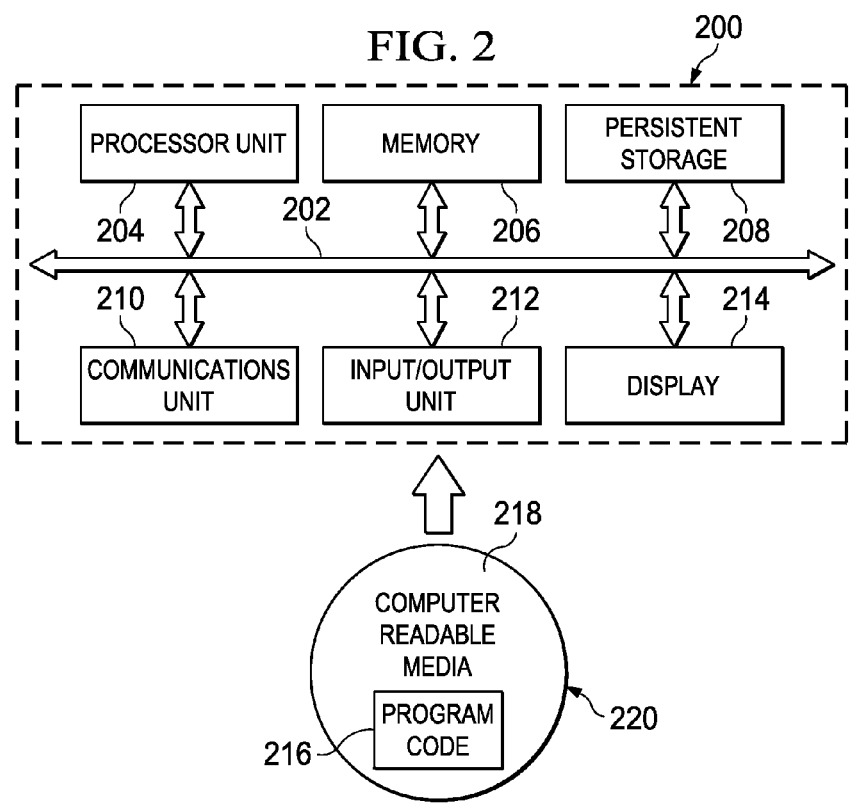
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The data processing system supports context-based security policy mechanisms that are known in the art. One such mechanism is eXtensible Access Control Markup Language, or XACML. Familiarity with XACML is presumed. An XACML policy consists of a policy set and a policy combining algorithm. A policy set is a sequence of policies or policy sets, and a target, and a policy is a target, a rule set, and a rule combining algorithm. A target specifies the type of requests to which the policy or policy are applied. Only if a request satisfies the target of a policy is the request then checked against the policy rule set. A rule set is a set of rules, and a rule has a target, an optional condition and an effect (e.g., permit or deny). The rule target specifies whether the rule is applicable to the request. If a request matches the target and any condition of a rule, the effect is returned as a decision. XACML provides for several rule or policy combining algorithms including, without limitation: first-applicable, only-one-applicable, deny-overrides, and permit-overrides. XACML access control works by evaluating an XACML request (containing an authenticated subject, the resource being accessed, and the action being performed) with one or more XACML-based access control policies, and returning an XACML response permitting or denying the requested access.

By way of additional background, FIG. 3 illustrates the high level components of a known policy evaluation manager. Policy management configuration 300 is an example implementation of evaluation manager 302 within the context of data processing system 200 of FIG. 2. In particular, policy evaluation manager 302 is shown within memory 206 of data processing system 200 of FIG. 2. Policy evaluation manager 302 may also be located within other memory locations until needed for use as desired. Other memory locations include persistent storage 208 of FIG. 2. Policy evaluation manager 302 is comprised of a number of cooperating components to deliver effective evaluation of security policy related requests. The components typically comprise an index builder 304, a parser 306, an editor 308, a retriever 310, an evaluator 312, and a rules database (DB) 314. The components work in cooperation with one another, but also with other system-related components. Although shown as separate entities, the components may also be implemented as a collection of services within a common offering, or combined in other ways to achieve the same functional capability.

Index builder 304 provides a capability to produce keys based on values for rules for vocabulary elements. The key of the index is the combination of attribute values that must be contained in a request for the rule to be applicable. The key is therefore built from the attribute value combinations. The index key reduces the time required to determine an applicable policy element related to a request. A policy element is an attribute and value combination. For example, an attribute of "subject-id" and an associated value of "Craig" defines a policy element of "subject-id=Craig." A policy is then a set of policy elements that when evaluated with an associated condition may provide a single result. Parser 306 provides a parsing capability to analyze the requests, the rule information, and the policy vocabulary. The parser may be the same parser used to interpret the markup language used or may be specialized for additional tasks. Editor 308 has a capability of creating, modifying and deleting rules, as well as policy elements. Editor 308 may be a typical text editor or other edit-capable component adapted to work with the data format chosen for the policy elements and rules implementation. Retriever 310 fetches rules from a rules database or storage system as required for evaluation of a request. Retrieval may be for a list or set of candidate rules that are later evaluated. Rules may also be retrieved for subsequent processing by an editor. Evaluator 312 provides a capability to examine rules provided in turn to determine a result. As stated previously, the result must return a "true" for the rule to be applicable.

Rules database (DB) 314 contains a set of rules. Rules are composed of a target portion and a condition portion. The target portion defines the subject or target of the rule. The condition portion defines criteria applicable to the target that must be met in combination with the subject for the rule to be true. For example, a rule for salary processing may have a target of "annual salary" and a condition portion of "less than 20,000." Index 316 is a set of related keys obtained through the build process of index builder 304. The keys of index 316 represent an ordered list of corresponding policy elements. Policy table 318 is a data structure comprising entries for the policy elements and rule identifiers. Each row in the data structure, when implemented as a table, contains a policy and a corresponding rule entry. The policy elements define the key.

Once an XACML policy has been flattened (by known techniques), the result is a set of policy elements that are distinct. Typically, each rule is only applicable to one request. This applicability is determined by a combination of functions, such as "string-equals" and "integer-greater-than." The only restriction on the functions is that they must take two parameters as arguments and return a Boolean value. The indexing process requires only equality functions are present in the target of the policy elements. This restriction ensures that an efficient set lookup can be performed rather than the sequential checking for matched values that is normally required by XACML. To achieve this, the non-equals matching functions are moved from the target section of the rule to the condition section, or portion, of the rule, combined with any existing condition using a boolean AND operator.

A policy may be indexed such that a policy element applicable to a given request can be quickly and efficiently determined. In one known approach, the policy is reduced to a set of distinct rules, where each rule is applicable to only one request. An index is created for these distinct rules, where the key of the index is the combination of attribute values that must be present in the request for the rule to be applicable. To ensure efficient lookups from the index, all functions that do not involve equality checks are located in the condition portion of the rule. This indexing process typically allows large sets of security policy to be more efficiently evaluated. A request is received containing policy elements. The request is handled so that the policy elements are resolved through an index look-up to a rule for the set of policy elements. The rule is then evaluated for the policy elements. The indexing provides a more efficient mechanism to determine applicability of a rule for a given policy.

It is also known in the art to provide a mechanism for building and walking a tree data structure to evaluate potential entitlement values to return for a given entitlement request. An approach of this type is described in U.S. Publication No. 2011/0246498, which is commonly-owned, the disclosure of which is incorporated herein by reference. In that approach, a context-based (e.g., XACML) policy having a set of attributes is evaluated using a weighted index tree having one or more leaves extending from a root node. Each leaf of the tree represents a policy rule. A depth-first path down the leaf represents one or more attributes of the set of attributes that must be present in a request for the rule to be applicable. An input is evaluated against the weighted index tree to generate a response. One type of input is an authorization request, in which case the response is an authorization decision (e.g., permit or deny). Another type of input is a query for a set of entitlements, in which case the response is a set of entitlements.

FIG. 4 illustrates a representative enterprise policy management system 400 that is also known in the art. The system 400 may be implemented across one or more machines operating in a computing environment, such as shown in FIG. 1. Typically, the system comprises a policy administration point (PAP) 402, the policy decision point (PDP) 404, and a policy enforcement point (PEP) 406. Generally, the policy administration point 402 is used to define a policy, which may be specified as a set of XACML policy expressions. This policy uses subject attributes provided from a user repository 408, as well runtime and environment data received from policy information point (PIP) 410. The policy decision point (PDP) 404 receives similar information and responds to an XACML policy query received from the policy enforcement point (PEP) 406 to enforce the policy on a subject and with respect to a particular action initiated by the subject. The PDP 404 implements the policy decision. In one commercial implementation of this approach, the PAP 402 is implemented by IBM® Tivoli® Security Policy Manager (TSPM) policy service/console, the PDP 404 is implemented in the TSPM runtime security service, and the PEP is implemented as a TSPM plug-in to application server, such as IBM WebSphere® Application Server.

The policy management system may be implemented using one or more computing machines, such as shown in FIG. 2.

The policy administration point typically includes a web-based user interface by which an enterprise privacy policy may be authored and distributed.

Dynamic Policy-Based Entitlements from External Data Repositories

With the above as background, the subject matter of this disclosure is now described. According to this disclosure, the general problem to be solved is how to determine which resources from a very large data set are authorized to have an action performed on them by a user. The criteria under which access should be granted is defined in a set of security policies; however, the resources that are being accessed are stored outside of the set of security policies, e.g., in an existing external repository such as a database or LDAP server.

As will be seen, the techniques of this disclosure may be implemented within a conventional XACML-based processing chain, which preferably includes a suitable request and response protocol to handle queries. Preferably, the functionality is implemented within a Policy Decision Point (PDP) (or other authorization engine), or as an adjunct thereto. A policy management system such as shown in FIG. 4 is representative of the operating environment, although this is not a limitation. As used herein, an "authorization request" is a request to a PDP asking for a permit/deny decision, such as "can the user Craig perform the 'read' action on the resource 'resource-1'?" An "entitlement request" is a request to the PDP asking for a set of values, such as "which resource(s) are the user Craig allowed to perform the 'read' action on?"

Figure 5:
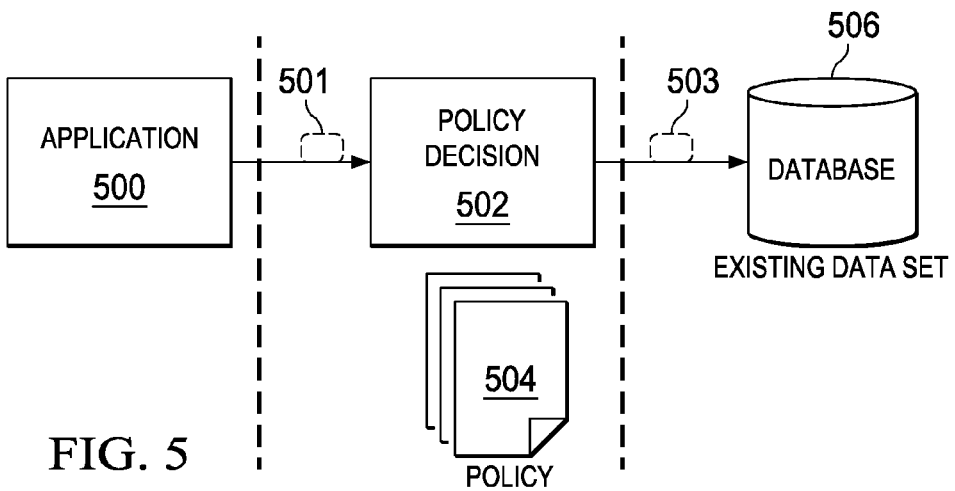
FIG. 5 illustrates how an application interacts with a Policy Decision Point (PDP) and the dynamic generation of a query to an external data repository according to this disclosure.

FIG. 5 illustrates the basic operating environment in which the dynamic policy-driven query operation is practiced. As illustrated, an application 500 calls the PDP 502 using an entitlement request 501, and the PDP 502 builds a candidate set of values based on the defined policy 504. The calling application 500, which may be of any type, preferably interacts only with the PDP 502, and thus the application is not concerned with how or where the data is stored. In this regard, the application 500 is the purview of an application team, whereas the PDP is within the purview of a security team. The PDP builds the candidate set of values (based on the defined policy) by interacting with at least one external data repository 506. A data repository is within the purview of a database administrator. The external data repository 506 may be one of many different types, and these external data sources may vary from one another in structure, design and query language, as well as location. According to this disclosure, and as well be described, the PDP 502 dynamically generates a query 503 to the external data repository 506 at runtime, i.e., during the processing of an entitlement request received by the PDP from the application 500. Although one query 503 to external data repository 506 is shown, there may be multiple queries to the repository, and/or multiple distinct queries to distinct multiple external repositories.

The query is generated dynamically at "runtime" of the PDP, namely, upon receipt of the entitlement request from the application that is to be evaluated by the PDP.

Figure 6:
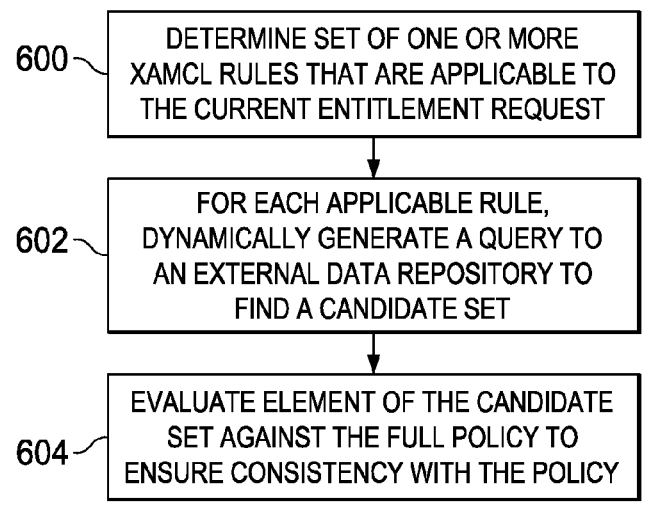
FIG. 6 is a process flow illustrating the policy-driven querying of the external data repository according to this disclosure.

FIG. 6 illustrates the basic operation, which may be implemented in the PDP shown in FIG. 4. At step 600, the set of one or more XACML rules that are applicable to the current entitlement request are determined. This determination may be carried out in one of several known ways, such as by a context-based security policy evaluation using weighted search trees, such as described in U.S. Publication No. 2011/0246498, or other known schemes. For each applicable XACML rule, any returned value from an external repository will have to satisfy the requirements of the rule. Thus, at step 602, and according to this disclosure, and for each applicable rule, a query to the external repository is dynamically-generated based on the rule to find a "candidate set" of return values. As will be described below, the query that is generated in step 602 does not have to be an exact translation of the XACML rule—it exists primarily as a way to narrow the search space to obviate a brute-force search of the database or repository. The query can be in many forms including, without limitation, direct translation to a SQL statement, direct translation to a LDAP filter, translation to an intermediary form that is back-end agnostic, or the like. In this manner, the "candidate set" of potential values is bounded to the set of values defined by the security policy itself (or by a purpose-built supplemental store), and not from the existing external sources themselves. At step 604, and to complete the operation, each element of this candidate set is evaluated against the full policy as an authorization request to ensure all the requirements of the security policy are being met.

Figures 7, 8:
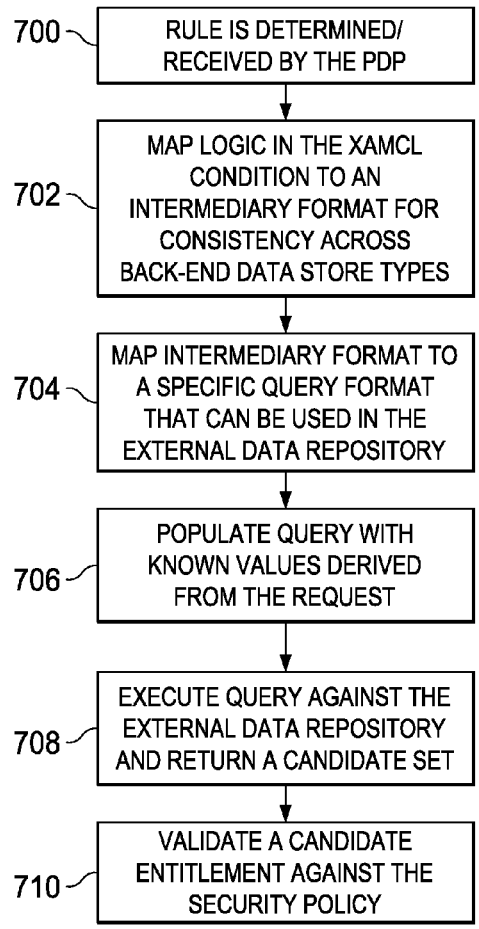
FIG. 7 is a process flow illustrating a technique for generating the dynamic query to the external data repository.
FIG. 8 is a representative database table for use according to a first example scenario.

FIG. 7 illustrates a preferred technique that may be used to formulate and execute a search against an external database using a dynamically-generated query based on a specific rule. The process shown in FIG. 7 preferably is automated and is carried out (in the PDP) for each rule that is returned. The routine begins at step 700 upon determination (or receipt) of the rule. At step 702, logic in the XACML "condition" is mapped to an intermediary format for consistency across back-end data store types (e.g., DB2, LDAP, and the like). At step 704, the intermediary format is then mapped to a specific query format that can be used in the external repository. At step 706, known values from the request are then populated into this query. As described above with respect to FIG. 6, the query is then executed against the external data store. The query execution against the external data repository is step 708, and it results in return of a candidate set of allowed values. As an optimization, each value returned is considered a "candidate" entitlement and then checked against the full policy. This is step 710. As shown in FIG. 7, steps 700, 702, 704 and 706 represent the query formulation, and steps 708 and 710 represent the query execution (i.e., the search of the external data repository). As noted above, depending on the policy (and the rule conditions therein) there may be multiple queries generated and executed against the repository, or multiple repositories (including those of distinct types).

As one of ordinary skill will appreciate, the above-described technique provides a way to efficiently (and dynamically) query an external data repository as part of an entitlements call (from an application). The approach of creating an intermediate (or normalized) form of the query and then creating a specific query format that is populated with known values from the request leads to a more targeted search of the external data repository, thus leading to a more refined subset of data returned as a final result. This approach leads to a much higher efficiency than if a brute-force or other known approach (pre-filtering or duplication) approach is used.

The following provides several example scenarios to illustrate the above-describe operation.

Consider a database table containing a list of stock symbols, along with the associated stock exchange it is listed on. A table of this form is shown in FIG. 8. As this data is frequently updated, it is a natural dataset for being externalized from any applicable security policy. Now, consider that a trading application needs to know which stocks symbols a trader is allowed to execute trades against. The following set of XACML attributes might then be defined: (Section/AttributeId), a description; Subject/subject-id, the distinguished name of the user; Subject/group-id, the set of group memberships for the user; Subject/trade-exchange, the exchanges the user is allowed to trade on; Resource/resource-id, the stock being traded; Resource/exchange, the exchange the stock is listed on; and Action/action-id, the action being performed on the stack (e.g., "trade"). For purposes of illustration, it is assumed that this set of attributes, which are merely exemplary, are used to define security policy and is used by the application when issuing (to the PDP) an authorization request or entitlements request.

Now, assume that the PDP also has a set of configuration data that binds these attributes to their source, which source may be the application, or an external data source. For example, these may be the bindings for the above attributes: Subject/subject-id, provided by the application; Subject/group-id, provided by the application; Subject/trade-exchange, retrieved from a policy information point (PIP) (such as element 410 in FIG. 4), namely a corporate directory, based on subject-id; Resource/resource-id, a SYMBOL column in a STOCK_SYMBOLS table (that lists stock SYMBOL(s) and their corresponding EXCHANGE(s)); Resource/exchange (an EXCHANGE column in a STOCK_SYMBOLS table; and Action/action-id, provided by the application. Notice that the Subject/trade-exchange attribute in this example is configured to be retrieved from a corporate LDAP directory using a Policy Information Point (PIP). In particular, the PDP will use the Distinguished Name (DN) found in the Subject/subject-id attribute provided by the application, find the entry in the LDAP server, and return a possibly multi-valued attribute from that entry containing the stock exchanges for which the trader is allowed to execute trades against. Also, note that the attributes Resource/resource-id and Resource/exchange are configured to be retrieved from the external database table that associates SYMBOL(s) with EXCHANGE(s). There may also be additional configuration to allow these attributes to be used as data from external entitlements.

Now, consider the following security policy: "The current user is permitted to trade a stock if its exchange is in the list of allowed exchanges for that user." This security policy might then be represented by the XACML snippet set forth in FIG. 9. Using that security policy, the trading application would then make an entitlement request to the PDP, specifying the known attributes and the attribute requested as the entitlement request return value. That entitlement request might be specified as set forth in FIG. 10. According to this disclosure, during evaluation, the PDP determines the XACML rule (in FIG. 9) to be applicable. The PDP also determines that, because the rule does not specify a value for Resource/resource-id, a call to the external repository (to obtain possible values for this attribute) is then required. Moreover, as the Action/action-id value was matched from the input request (in this example), the XACML <Condition> is the relevant part of the request that needs to be translated to an external query.

To that end, and according to this query-generation process of this disclosure, the XACML <Condition> is first translated to the following normalized form: [Attribute] [Function] [Attribute]. Of course, depending on the XACML condition, the attributes may be combined using Boolean logic. This example omits such details for clarity of explanation. Continuing with this example, and substituting the attributes, the above normalized form is then rewritten as follows: [Resource/exchange] [equals] [Subject/trade-exchange]. Now, because it is desired to obtain back values of the Resource/resource-id attribute, the query is generated by prepending this attribute to the above-generated normalized form (using a Find operand):

Find [Resource/resource-id] for which [Resource/exchange] [equals] [Subject/trade-exchange]

The above statement represents the intermediary (or normalized) format of the dynamically-generated query (as described in step 702 in FIG. 7). This generic format is then translated to a native query specific to the type of data repository to be queried. In this example, it is assumed that the external data repository is a SQL database. Thus, given that the search will be of a database table, the example normalized query is translated to SQL (as described in step 704 in FIG. 7), e.g.:

SELECT [Resource/resource-id] WHERE [Resource/exchange] EQUALS [Subject/trade-exchange]

Given that there are known mappings for some of the attributes to columns in this table, these mappings are then substituted into the query (as described in step 706, in FIG. 7), thereby producing a near-final form of the SQL query:

SELECT SYMBOL FROM STOCK_SYMBOLS WHERE EXCHANGE EQUALS [Subject/trade-exchange]

The missing piece of this query can be resolved by PDP as being retrieved from the PIP using the corporate directory. Assume that the query to the PIP returned only the value "NYSE." This value too can then be substituted to produce the final query:

SELECT SYMBOL FROM STOCK_SYMBOLS WHERE EXCHANGE EQUALS "NYSE"

This query is then executed against the external database and returns a candidate set, e.g., {IBM BAC}. As noted above, these values comprise the candidate set that are returned from the current entitlement query. This is step 708 in FIG. 7. These values are then individually evaluated against the full set of security policy (step 710 in FIG. 7), as there may be other rules that are applicable or portions of the condition that could not be translated to an SQL clause.

As another example, consider a bank account database table, CUST_ACCOUNTS, which contains the following information: ACT_ID, the unique number of the account, CUST_ID, an internal identifier for the customer, TYPE, the type of the account, such as checking or savings, and BAL, the balance in the account. For the purposes of this example, assume that the database is populated as shown in the table in FIG. 11. Using a known approach (of defining resources in an external repository), various columns can be mapped to attribute identifiers, such as ACT_ID="Resource/db: account-id", CUST_ID="Resource/db: customer-id", TYPE="Resource/db: account-type", and BAL="Resource/db: account-balance." The Resource in this example refers to a section of the XACML Request, however, the approach herein is not limited to XACML.

In this example, it is further assumed that an applicable security policy states that a customer can view their own accounts. A pseudo-XACML representation of this rule is shown in FIG. 12. This rule states that the request will be Permitted if the Subject's "customer-id" attribute is equal to the Resource's "db: customer-id" attribute. As a use case, assume it is desired to query for entitlements to list the particular accounts that a customer has permission to view, given the following inputs: subject/subject-id=craigf, Subject/customer-id="Cust001", Action/action-id="view" and Return attribute? Resource/db: account-id. This entitlements request is shown in FIG. 13.

According to the query generation method of this disclosure, the normalized form of the XACML rule <Condition> is first generated:

[Subject/customer-id] [equals] [Resource/db:customer-id]

Note that the "equals" clause is based on the <Condition> containing the "string-equals" function. Other functions in the <Condition> would be mapped to other generic functions, such as "greater than" or "less than." The value that is attempted to be located is then added to generate the initial form of the query:

Find [Resource/db:account-id] for which [Subject/customer-id] [equals] [Resource/db:customer-id]

This completes the step of mapping the logic in the <Condition> to the intermediary format. The process then continues to map the intermediary format to the specific query format that can be used in the external data source. Here, once again the repository is a database table, so the query is converted to SQL format:

SELECT [Resource/db:account-id] FROM CUST_ACCOUNTS WHERE 'Cust001' EQUALS [Resource/db:customer-id]

If the query was to an LDAP directory, the generic representation (the intermediate format) would be an LDAP search filter. After this initial mapping of the intermediary format into the specific query format, known data fields are then populated into the query. Assuming the current user's customer ID is known, this value is substituted:

SELECT ACT_ID FROM CUST_ACCOUNTS WHERE 'Cust001' EQUALS [Resource/db:customer-id]

Given the knowledge of the mapping from database table columns to attribute identifiers, the attribute reference can then be replaced with the specific column name to complete the query generation process:

SELECT ACT_ID FROM CUST_ACCOUNTS WHERE 'Cust001' EQUALS CUST_ID

This query can then be executed against the data store, returning only the applicable account identifier, which in this example is "000-001." Preferably, and as noted above, each value returned is only considered a "candidate" entitlement that is then checked against the full security policy.

As the above examples illustrates, the external data repository may be represented as a set of entities, wherein each entity has a unique identifier, and a collection of multi-valued attributes. The individual entities can be extracted by their unique IDs, and the entities can be searched based on the values of their attributes.

The above-described query generation technique may be expanded to handle more complex scenarios (i.e., more complex XACML conditions, which would be translated to more complex queries), repository sources with more-complicated schemas, non-standard repository sources, which can be exposed via application programming interfaces (APIs), large data sets, and attributes in the query being populated from multiple PIPs.

The described subject matter provides many advantages. A primary advantage is that it shifts the building of the candidate set of potentially allowed resources to the PDP. As has been described, the application calls the PDP using an "entitlement request," and the PDP builds the candidate set of values based on the defined policy. In effect, rather than hard-coding a query into the application, the PDP builds a policy-driven query at runtime (and, in particular, at execution of the entitlements query). Using this approach, the application team interacts only with the PDP, meaning the application is not concerned with how or where the data is stored. The security policy is not duplicated in multiple places within the IT environment. The security team can update the policy without requiring an application update. There is one canonical store of data to be used as return values—the existing repository. This solution does not require duplication of this data into the security policy or a supplemental store used only by the PDP. The return values are based off live data, not duplicated or copied data. The application team interacts with the security team, and the security team with the DB administrators.

As has been described, preferably the PDP represents the XACML policy in both a neutral representation and also a language-neutral query language that can be configured to map to different data repositories (that may be different in structure, design and query language), but that can export query subjects, terms and actions to applications in the manner described. The union of these functions in the PDP facilitates the efficient querying of one or more external repositories as part of an entitlements call.

Without limitation, and as noted above, the above-described PDP functions may be implemented in software, as one or more specialized or "particular" machines. The policy evaluation may be implemented in a specialized or "particular" machine, such as an entitlements server. Conventional identity management tools and systems, such as IBM® Tivoli Security Policy Manager, and Integrated Solutions Console, may be adapted for this purpose, or the techniques may be implemented in any other convenient manner.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

Without limitation, the techniques described herein also may be implemented in or in conjunction with various server-side architectures including simple n-tier architectures, web portals, federated systems, and the like.

An access control mechanism that implements the disclosed techniques may be implemented as a service, or as a standalone machine.

The techniques may apply to any context-based security policy, and not merely XACML-based techniques. Other examples of context-based security policy include eXtensible rights Markup Language (XrML) and Enterprise Privacy Authorization Language (EPAL).

The policy evaluation may be implemented with any request-response protocol and with other API mechanisms than the XACML-based versions explained above.

Although not required, an XACML request-response protocol for use with the subject matter of this disclosure may include a response that contains xacml:Request objects. This is because the semantics are such that combining the input Request with the returned Response creates a Request that will evaluate to the specified effect (e.g., Permit). Using Request in the response container allows preservation of any Boolean AND semantics that may occur. In addition, in the entitlements embodiment, an application programming interface (API) may be used to call an entitlements engine to fetch the resources and, in response, return a set of entitlements.

Having described our invention, what we now claim is as follows.

The invention claimed is:

1. A method for evaluating a context-based policy, the policy having a set of attributes, comprising:
   receiving an entitlement request for a set of one or more entitlement values to be used by the policy to evaluate an authorization request;
   upon receipt of the entitlement request, and based at least on the policy, formulating a search query against an external data repository;
   executing the search query against the external data repository and, in response, receiving, as a result, a candidate set of one or more entitlement values, wherein the candidate set of one or more entitlement values is bounded by the policy;
   evaluating the entitlement request against the policy and the result of the search query to generate a response to the entitlement request:,
   wherein the receiving, formulating, executing and evaluating steps are implemented in software logic executing on a hardware element.

2. The method as described in claim 1 wherein the context-policy is specified in XACML.

3. The method as described in claim 1 wherein formulating step includes:
   identifying at least one rule that is applicable to the entitlement request; and
   for each rule identified, translating the rule into the search query.

4. The method as described in claim 3 wherein the translating step includes:
   mapping logic in the rule to a normalized format;
   mapping the normalized format into a specific query format associated with the external data repository; and
   populating one or more known values of the policy attributes into the specific query format to generate the search query.

5. The method as described in claim 4 wherein the specific query format is one of: an SQL statement, an LDAP filter, and a back-end agnostic format.

6. The method as described in claim 1 further including validating an entitlement value against the policy.

7. The method as described in claim 1 wherein the external data repository is one of: a relational database, and a directory.

8. The method as described in claim 7 wherein the external data repository is represented as a set of entities, wherein each entity has a unique identifier and a collection of multi-valued attributes that are adapted to be searched based on values of their attributes.

9. Apparatus, comprising:
   a processor; and
   computer memory holding computer instructions that, when executed by the processor, perform a method to evaluate a context-based policy, the policy having a set of attributes, the method comprising:
      receiving an entitlement request for a set of one or more entitlement values to be used by the policy to evaluate an authorization request;
      upon receipt of the entitlement request, and based at least on the policy, formulating a search query against an external data repository;
      executing the search query against the external data repository and, in response, receiving, as a result, a candidate set of one or more entitlement values, wherein the candidate set of one or more entitlement values is bounded by the policy;
      evaluating the entitlement request against the policy and the result of the search query to generate a response to the entitlement request.

10. The apparatus as described in claim 9 wherein the context-policy is specified in XACML.

11. The apparatus as described in claim 9 wherein the formulating step includes:
    identifying at least one rule that is applicable to the entitlement request; and
    for each rule identified, translating the rule into the search query.

12. The apparatus as described in claim 11 wherein the translating step includes:
    mapping logic in the rule to a normalized format;
    mapping the normalized format into a specific query format associated with the external data repository; and
    populating one or more known values of the policy attributes into the specific query format to generate the search query.

13. The apparatus as described in claim 12 wherein the specific query format is one of: an SQL statement, an LDAP filter, and a back-end agnostic format.

14. The apparatus as described in claim 9 wherein the method further includes validating an entitlement value against the policy.

15. The apparatus as described in claim 9 wherein the external data repository is one of: a relational database, and a directory.

16. The apparatus as described in claim 15 wherein the external data repository is represented as a set of entities, wherein each entity has a unique identifier and a collection of multi-valued attributes that are adapted to be searched based on values of their attributes.

17. A computer program product in a non-transitory computer-readable storage medium for use in a data processing system, the computer program product holding computer program instructions which, when executed by the data processing system perform a method to evaluate a context-based policy, the policy having a set of attributes, the method comprising:
    receiving an entitlement request for a set of one or more entitlement values to be used by the policy to evaluate an authorization request;
    upon receipt of the entitlement request, and based at least on the policy, formulating a search query against an external data repository;
    executing the search query against the external data repository and, in response, receiving, as a result, a candidate set of one or more entitlement values wherein the candidate set of one or more entitlement values is bounded by the policy;
    evaluating the entitlement request against the policy and the result of the search query to generate a response to the entitlement request.

18. The computer program product as described in claim 17 wherein the context-policy is specified in XACML.

19. The computer program product as described in claim 17 wherein the formulating step includes:
    identifying at least one rule that is applicable to the entitlement request; and
    for each rule identified, translating the rule into the search query.

20. The computer program product as described in claim 19 wherein the translating step includes:
    mapping logic in the rule to a normalized format;
    mapping the normalized format into a specific query format associated with the external data repository; and
    populating one or more known values of the policy attributes into the specific query format to generate the search query.

21. The computer program product as described in claim 20 wherein the specific query format is one of: an SQL statement, an LDAP filter, and a back-end agnostic format.

22. The computer program product as described in claim 17 wherein the method further includes validating an entitlement value against the policy.

23. The computer program product as described in claim 17 wherein the external data repository is one of: a relational database, and a directory.

24. The apparatus as described in claim 23 wherein the external data repository is represented as a set of entities, wherein each entity has a unique identifier and a collection of multi-valued attributes that are adapted to be searched based on values of their attributes.

25. An access control system, comprising:
    a context-based security policy stored in a computer memory;
    a policy evaluation mechanism comprising a set of computer instructions stored in the computer memory and being executed by a processor to carry out the following operations:
        receiving an entitlement request for a set of one or more entitlement values to be used by the policy to evaluate an authorization request;
        upon receipt of the entitlement request, and based at least on the policy, formulating a search query against a data repository external to the policy evaluation mechanism;
        executing the search query against the data repository and, in response, receiving a candidate set of one or more entitlement values, wherein the candidate set of one or more entitlement values is bounded by the policy;
        evaluating the entitlement request against the policy and at least one of the entitlement values in the candidate set to generate a response to the entitlement request; and
    an access control mechanism that uses the response to the entitlement request to enable an access control operation.

* * * * *